United States Patent [19]

Schmit

[11] 4,295,904

[45] Oct. 20, 1981

[54] METHOD OF HEAT SEALING A FILM TO THE LIP OF A CUP

[75] Inventor: Paul F. Schmit, Stillwater, Minn.

[73] Assignee: Minnesota Mining and Manufacturing Company, St. Paul, Minn.

[21] Appl. No.: 144,613

[22] Filed: Apr. 28, 1980

Related U.S. Application Data

[62] Division of Ser. No. 917,586, Jun. 21, 1978, Pat. No. 4,216,050.

[51] Int. Cl.[3] .......................... B29C 27/02; B65B 7/28

[52] U.S. Cl. ........................................ 156/69; 53/478; 53/485; 156/84; 156/160; 156/183; 156/196; 156/229; 264/230; 264/291; 264/342 R

[58] Field of Search ..................... 156/69, 84, 85, 160, 156/183, 196, 229; 53/478, 485, 557, 341, 298, 487; 264/230, 231, 239, 291, 342 R

[56] References Cited

U.S. PATENT DOCUMENTS

| | | | |
|---|---|---|---|
| 2,588,604 | 3/1952 | Archer | 156/69 |
| 3,414,181 | 12/1968 | Sloan | 264/230 |
| 3,792,181 | 2/1974 | Mahaffy et al. | 53/128 |
| 4,050,971 | 9/1977 | Verkins et al. | 156/69 |
| 4,092,817 | 6/1978 | Rist | 53/298 |

*Primary Examiner*—Michael G. Wityshyn

*Attorney, Agent, or Firm*—Cruzan Alexander; Donald M. Sell; William L. Huebsch

[57] ABSTRACT

A platen including an annular surface adapted to heat seal a piece of film to the lip of a cup, and a central projection which is hotter than the annular surface to cause greater shrinkage in a central portion than in the surrounding portion of the sealed piece of film. This shrinkage of the central portion and the resultant gathering of the surrounding portion results in a planar central portion of the sealed film with radially projecting ridges and grooves around its periphery. The ridges and grooves draw visual attention to the central portion and features, such as perforations for a straw-hole, located therein.

2 Claims, 4 Drawing Figures

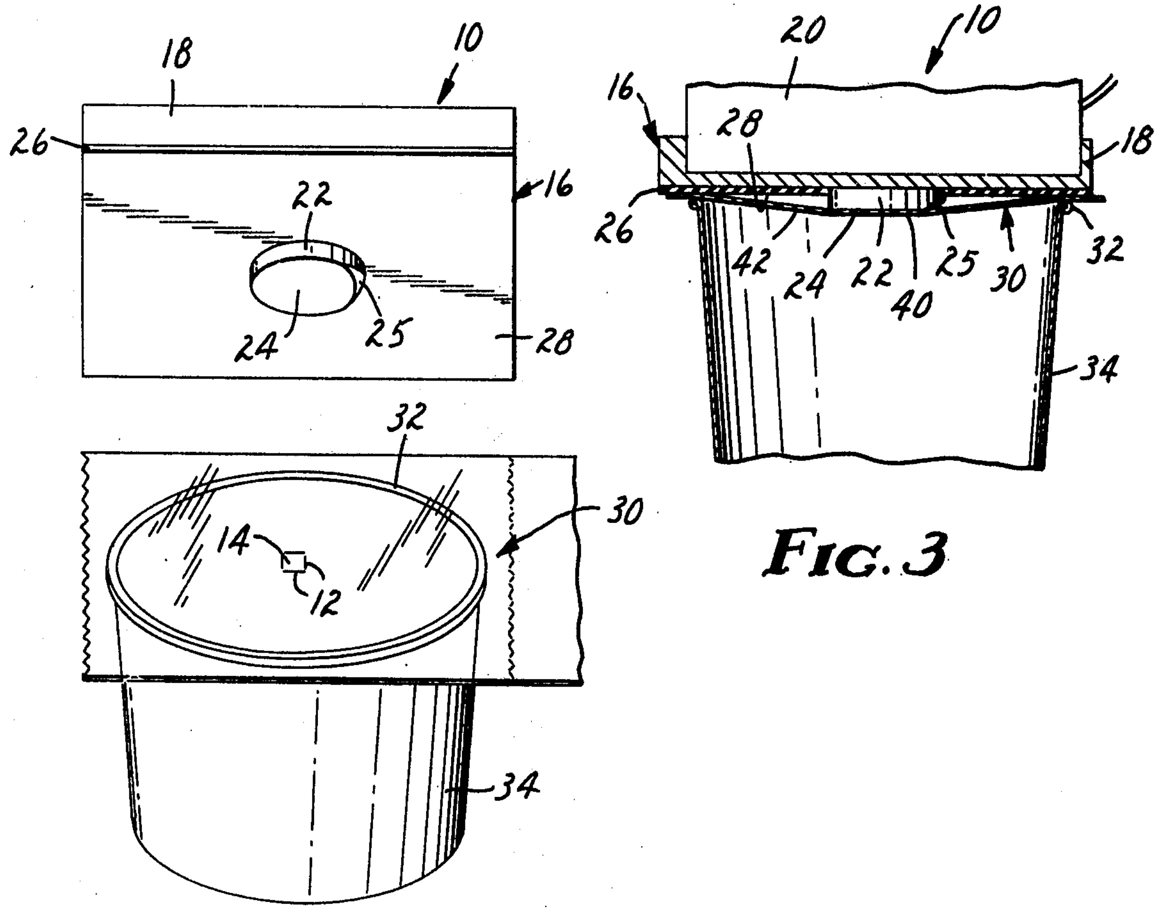
FIG. 1
FIG. 3
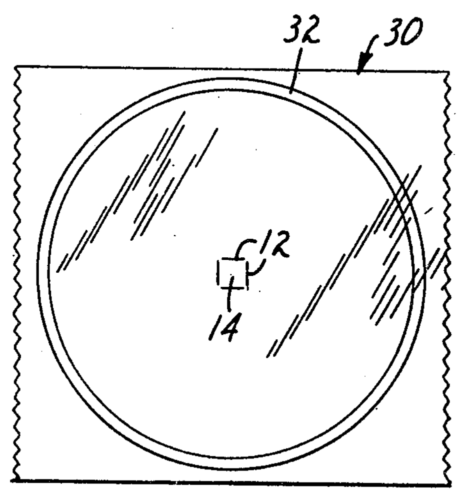
FIG. 2
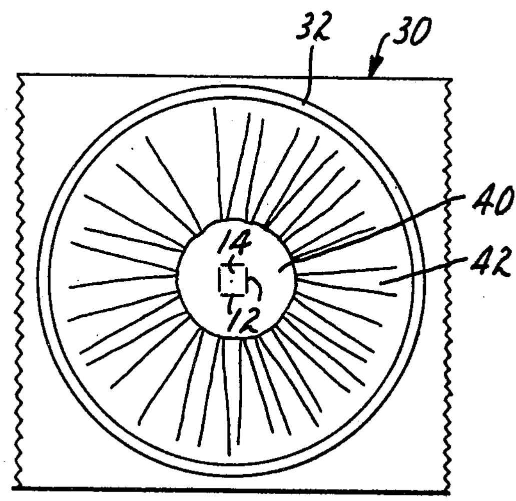
FIG. 4

METHOD OF HEAT SEALING A FILM TO THE LIP OF A CUP

This is a division of application Ser. No. 917,586, filed June 21, 1978, U.S. Pat. No. 4,216,050.

BACKGROUND OF THE INVENTION

The present invention relates to platens for heat sealing film to the lip of a cup, a method of heat sealing film, and a cup formed by the heat sealing method.

Platens and methods for heat sealing film to the lip of a cup are known, as are cups with pieces of heat sealable film fused to their lips over their open ends. U.S. Pat. No. 4,050,971 (the content whereof is incorporated herein by reference) describes a device and method for sealing a piece of film over the end of a cup. The device described therein includes a heat sealing platen comprising a heat conductive rigid support member, a layer of resiliently elastic material overlaying the support member and having an annular outer surface adapted to press and conform film against the lip of the cup, and means for heating to provide a temperature at the annular outer surface of the elastic material adapted to seal film to the lip of the cup. The device forms sealed cups by positioning a piece of the film adjacent the lip of the cup and over the cup opening, and pressing the film into contact with the lip of the cup while heating the film sufficiently to fuse it to the lip.

Additionally U.S. Pat. No. 4,092,817 describes a novel structure for forming perforations around a small portion of a piece of film applied to a cup by a device such as that described in U.S. Pat. No. 4,050,971, which small portion of the film can be removed to provide a straw-hole through the film. While this small portion of the film can be easily punched out so that a straw can be inserted into the cup, it has been found that the perforations are not easily seen by users of the cup, so that too many users of such cups unnecessarily resort to peeling the film away to gain access to the cup.

Attempts have been made to alert users by providing instructions in the film, however it is impossible to localize such instructions around the perforations since there is no way to tell where the perforations will be made in the film at the time that the film is printed.

SUMMARY OF THE INVENTION

The present invention provides a platen adapted to heat seal a piece of film to the lip of a cup by a method which shapes the surface of the sealed piece of film to draw visual attention to a feature in the sealed film such as perforations for a straw-hole.

The present invention provides a platen of the type described above which is adapted to seal a piece of heat sealable film to the lip of a cup. The platen includes a layer of resiliently elastic material overlying a heated rigid support member and defining an annular outer surface adapted to press and conform the film against the lip of the cup. Unlike the platen described above, however, the platen according to the present invention is adapted for use with heat sealable film which will shrink a small amount (i.e., up to about 10%) when heated to normal heat sealing temperatures (i.e. up to about 205 degrees Centigrade or 500 degrees Fahrenheit); and is improved in that it includes a projection surrounded by the annular outer surface of the resiliently elastic material. The projection has a surface portion heated by the heating means to a temperature exceeding that of the outer surface of the resiliently elastic material, and is adapted to contact and push the piece of film slightly into the opening of the cup as the piece of film is sealed to the cup. This contact will cause more shrinkage in the portion of the film contacted by the projection than in the surrounding portion of the film, which shrinkage will gather and corrugate the surrounding portion of the film into radially extending ridges and grooves. When the platen is removed the film sealed to the cup will have a planar portion where it was contacted and shrunk by the projection, surrounded by the radially extending ridges and grooves which will draw attention to the planar portion and a feature located in the planar portion of the film.

When the platen is used in conjunction with the structure described in U.S. Pat. No. 4,050,971 (which positions the perforations in the film in the center of the opening of the cup) the projection of the platen is centrally located, and the resulting sealed cups have the perforations located in the planar central portion of the film which is surrounded by radially extending ridges and grooves. This draws the users' attention to the central portion, and thus to the perforations therein which, it has been found, users can much more easily locate and identify than central perforations in a completely planar film over the end of the cup.

BRIEF DESCRIPTION OF THE DRAWING

The invention will be further described with reference to the accompanying drawing wherein like parts are similarly numbered in the several views, and wherein:

FIG. 1 is a perspective view of a preferred embodiment of a platen according to the present invention, and a piece of heat sealable film in position over a cup in preparation for the film to be sealed thereto by the platen;

FIG. 2 is a top view of the film of FIG. 1 over the cup prior to sealing of the film to the cup;

FIG. 3 is a fragmentary sectional view showing the platen of FIG. 1 sealing the film to the cup; and FIG. 4 is a top view of the film after it has been sealed to the cup by the platen of FIG. 1.

DESCRIPTION OF THE PREFERRED EMBODIMENT

Referring now to the drawing, there is shown in FIGS. 1 and 3 a platen according to the present invention generally designated by the reference numeral 10.

The platen 10 may be incorporated in a heat sealing device of the type described in U.S. Pat. No. 4,092,817 (the content whereof is incorporated herein by reference) for applying predetermined lengths of a heat sealable film over the open ends of cups from a supply length of the film, which heat sealing device is not shown in the drawing but comprises means adapted for advancing an end of the strip of heat sealable film along a path and over a cup supported in the device; a movable heated platen for applying heat and pressure to fuse a piece of the film to the lip of the cup; means for severing the applied piece of film from the supply length of film; and perforating means along the path in advance of the cup for forming perforations 12 in film to provide a small portion 14 of the film which can be separated along the perforations and bent aside to provide a straw-hole in the film, which perforating means are operated before the film is advanced to provide perforations 12 in the center of each piece of film applied to a cup.

As is seen in FIGS. 1 and 3, the platen 10 comprises a heat conductive rigid support member 16 (which may be of aluminum or other rigid highly heat conductive materials). The support member 16 comprises a generally rectangular upper portion 18 having an opening through its top surface in which is mounted a thermostatic regulated electric heater 20 which provides means for heating the platen 10; and a short cylindrical axially projecting portion 22 which projects from the center of an otherwise planar lower surface of the rectangular portion 18, has a circular lower distal surface 24, and is beveled on its edge 25 toward which the film is advanced as it is moved under the platen to restrict engagement of the film with the side of the cylindrical portion 22. Also included in the platen 10 is a uniformly thick layer 26 of resiliently elastic material (e.g. silicone rubber) overlaying the planar surface 24 of the support member 16 around the cylindrical portion 22, and providing a planar annular outer surface 28 around the cylindrical portion 22 adapted to press and conform a piece of film 30 against the lip 32 of a cup 34.

The layer of resiliently elastic material 26 is less thermally conductive than the support member 16, so that for any given setting the heater 20 will produce a lower temperature at the annular surface 28 than at the lower surface 24 of the cylindrical portion 22. When the platen 10 is caused to press the piece of film 30 against the lip 32 of the cup 34, the cylindrical projecting portion 22 will push or tent the piece of film 30 slightly into the opening of the cup 34 and the circular lower surface 24 of the cylindrical portion 22 will contact a central portion 40 of the piece of film 30 as the annular surface 28 seals the film 30 to the lip of the cup 34. The difference in temperature between the central portion 40 of the piece of film 30 contacted by the surface 24 and a surrounding portion 42 of the film 30 which is separated from the annular surface 28 will cause the central portion 40 of the film to shrink further than the surrounding portion 42 as the piece of film is sealed to the lip 32. This shrinkage of the central portion 40 will gather and corrugate the surrounding portions 42 into ridges and grooves extending radially outwardly of the central portion 40 toward the lip 32. When the platen 10 is removed, the central portion 40 of the piece of film 30 sealed to the cup 34 will be planar and will be surrounded by the radially extending ridges and grooves in the surrounding portion 42 which will draw attention to the perforations 12 in the central portion 40 (see FIG. 4).

EXAMPLE

The following is a specific nonlimiting example giving specifications for a platen 10 which has been used for sealing pieces of heat sealable film commercially designated "Scotchpack Brand" Heat Sealable Polyester Film No. 115 and available from Minnesota Mining and Manufacturing Company, St. Paul, Minn. to the lips of wax paper or foamed styrene cups of the types used respectively to dispense cold and hot drinks in the fast food industry.

Generally, the "Scotchpack 115 film" includes a 12.7 micrometer (½ mil) polyester backing with a 17.8 micrometer (0.7 mil) layer of heat sealable resin commercially designated DQD3737 and available from Union Carbide Corporation of New York, N.Y., which resin is a 28% vinyl acetate modified polyethylene. This film has been found to shrink about 2½ percent when heated to 150 degrees Centigrade or 300 degrees Fahrenheit, and about 5½ percent when heated to 205 degrees Centigrade or 400 degrees Fahrenheit.

When the platen 10 which had an aluminum support member 16 with a 25.4 millimeter (one inch) diameter cylindrical portion 22 projecting 3.2 millimeter (⅛ inch) from its annular outer surface 28 which surface 28 was defined by a 1.6 millimeter (1/16 inch) thick layer 26 of silicone rubber was used with its heater 20 set to provide a temperature of 163 degrees Centigrade (325 degrees Fahrenheit) on the annular surface 28 and 205 degrees Centigrade (400 degrees Fahrenheit) on the circular lower surface 24, and was pressed with 18 kilograms (40 pounds) force for a time duration of about two seconds to seal the film described above to a cup 34 with a 89 micrometer (3½) diameter lip 32, the film was securely sealed to the lip 32 of the cup 34 and the planar central portion 40 formed in the film was clearly distinguishable from the surrounding portion 42 of the film which had distinct ridges and grooves extending radially outwardly of the central portion 40.

Significantly decreasing the length of the cylindrical projecting portion 22 (which caused a smaller amount of the piece of film to be pressed into the open end of the cup 34 by the platen 10 during the sealing operation) resulted in a sealed film so tightly tensioned across the lip 32 of the cup 34 that it would sometimes separate from the lip 32; whereas significantly increasing the length of the cylindrical projecting portion 22 (which would cause a larger amount of the piece of film to be pressed into the open end of the cup) resulted in a sealed film which bagged into the cup 34.

I claim:

1. A method for sealing to the lip of a cup a piece of heat sealable film which will shrink a small amount when heated to normal heat sealing temperatures so as to draw attention to a feature in the film, said method comprising the steps of:

positioning a piece of the film adjacent the lip of the cup and over the cup opening with the feature surrounded by the lip of the cup;

pushing the piece of film slightly into the opening of the cup;

pressing the film into contact with the lip of the cup while heating the film to a first temperature adapted to fuse it to the lip; and heating a first portion of the film around the feature to a second temperature which exceeds said first temperature to shrink said first portion of the film and gather a portion of the piece of film surrounding said first portion into outwardly radially extending ridges and grooves.

2. A method according to claim 1 wherein said positioning step includes the step of positioning said feature centrally of the cup opening, and the first portion of the film is circular.

* * * * *